United States Patent
Pea et al.

(10) Patent No.: US 11,238,463 B2
(45) Date of Patent: Feb. 1, 2022

(54) INTELLIGENT SYSTEM FOR ONLINE CUSTOMER ASSISTANCE

(71) Applicant: COUPANG CORP., Seoul (KR)

(72) Inventors: Yoon Seok Pea, Yong-In (KR); Gi Yong Gil, An-Yang (KR); Jae Young Park, Seoul (KR); Seung Hee Han, Gwang-Myeong (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/872,779

(22) Filed: May 12, 2020

(65) Prior Publication Data

US 2021/0357949 A1 Nov. 18, 2021

(51) Int. Cl.
| | |
|---|---|
| G06Q 10/00 | (2012.01) |
| G06Q 30/00 | (2012.01) |
| G06Q 10/08 | (2012.01) |
| G06N 5/04 | (2006.01) |

(Continued)

(52) U.S. Cl.
CPC ....... G06Q 30/016 (2013.01); G06F 16/9535 (2019.01); G06F 40/205 (2020.01);
(Continued)

(58) Field of Classification Search
CPC .......................... G06Q 10/087; G06Q 30/0631
(Continued)

(56) References Cited

U.S. PATENT DOCUMENTS 9,530,148 B2 * 12/2016 Flatt ................. H04N 21/23424
2004/0210492 A1 10/2004 Husain et al.
(Continued)

FOREIGN PATENT DOCUMENTS

JP 2003-162597 A 6/2003
JP 2003-528412 A 9/2007
(Continued)

OTHER PUBLICATIONS

Korean WIPS Search Report for Application KR-2020-0084711, dated Sep. 8, 2020, (7 pages).
(Continued)

*Primary Examiner* — Rokib Masud
(74) *Attorney, Agent, or Firm* — Finnegan, Henderson, Farabow, Garrett & Dunner, LLP

(57) ABSTRACT

A computer-implemented systems and methods for online customer assistance are disclosed. The computer-implemented system comprises a user interface, a memory storing instructions, and at least one processor. The at least one processor may be configured to execute instructions to receive a request for assistance from a customer via the user interface, identify at least one last-ordered product, and aggregate customer specific information, one or more previously-ordered products, and the customer specific information that may include product delivery information. Furthermore, the at least one processor may be configured to execute instructions to determine an action pattern of the customer for the at least one last-ordered product, assigning a priority to the order for the at least one last-ordered product or previously-ordered products, determine a response to the customer based on the priority of the order, and provide the response to the request from the customer device via the user interface.

21 Claims, 15 Drawing Sheets

(51) Int. Cl.
  *G06F 40/205* (2020.01)
  *G06F 16/9535* (2019.01)
(52) U.S. Cl.
  CPC ............ *G06N 5/04* (2013.01); *G06Q 10/087* (2013.01); *G06Q 10/0838* (2013.01); *G06Q 10/0832* (2013.01); *G06Q 10/0837* (2013.01)
(58) Field of Classification Search
  USPC ...................................................... 705/16, 21
  See application file for complete search history.

(56) References Cited

U.S. PATENT DOCUMENTS

| | | | | |
|---|---|---|---|---|
| 2009/0192888 | A1* | 7/2009 | Barton | G06Q 30/0234 705/14.34 |
| 2014/0095265 | A1* | 4/2014 | Steinman | G06Q 10/0637 705/7.36 |
| 2015/0032602 | A1* | 1/2015 | Blackhurst | G06Q 40/02 705/39 |

FOREIGN PATENT DOCUMENTS

| | | | | |
|---|---|---|---|---|
| JP | 2011-209938 | A | 10/2011 | |
| KR | 10-2004-0083964 | A | 10/2004 | |
| KR | 10-2004-0104097 | A | 12/2004 | |
| KR | 10-2015-0044035 | A | 4/2015 | |
| KR | 10-2016-0150170 | A | 12/2016 | |
| KR | 10-2017-0085741 | A | 7/2017 | |
| KR | 10-1997202 | B1 | 7/2019 | |
| WO | WO-2009100488 | A1 * | 8/2009 | ............ G06Q 30/02 |
| WO | WO-2011025856 | A1 * | 3/2011 | ......... G06Q 30/0617 |

OTHER PUBLICATIONS

International Search Report and Written Opinion in counterpart Application No. PCT/IB2020/062560 dated Apr. 8, 2021 (8 pages).

* cited by examiner

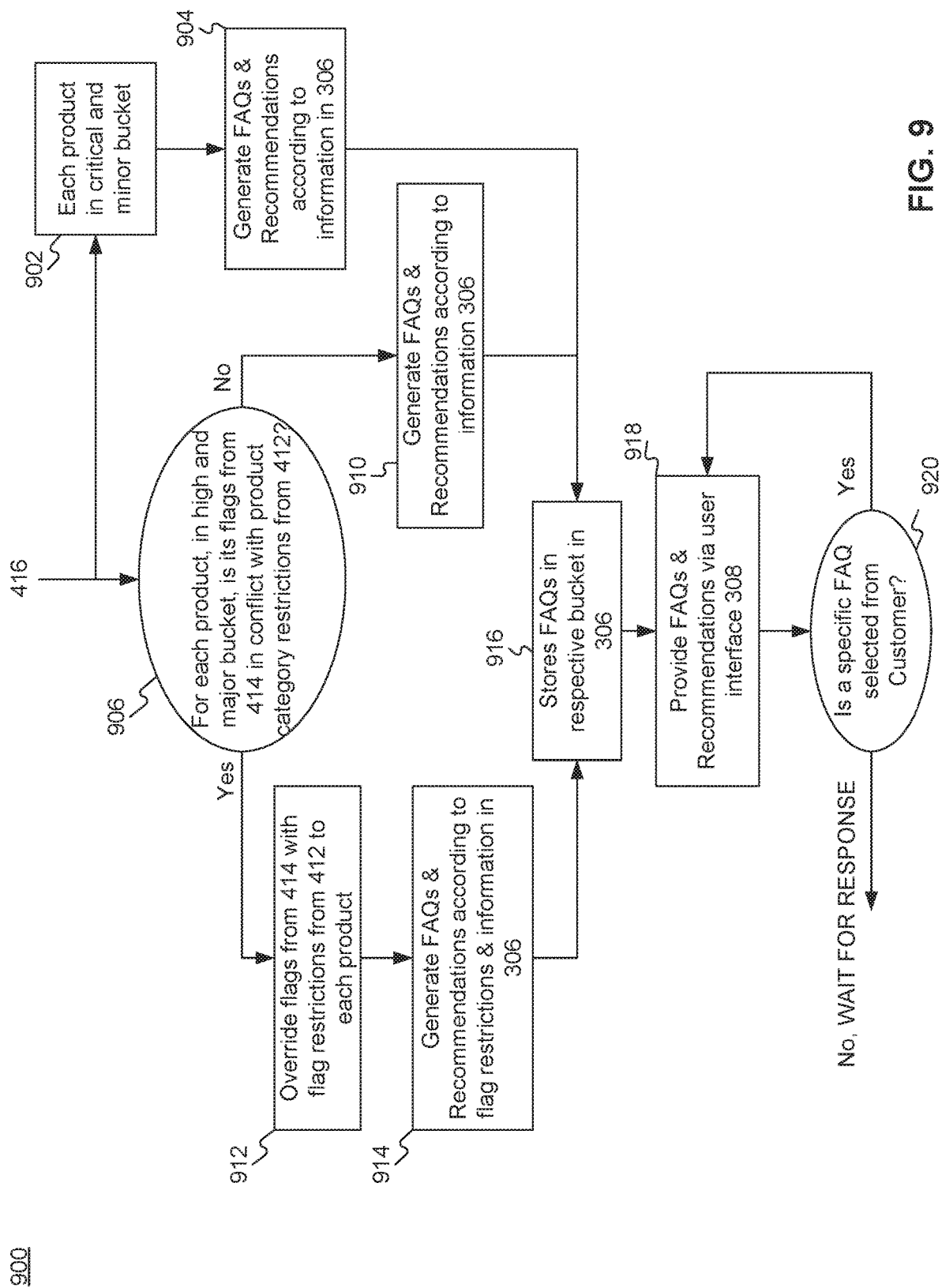

INTELLIGENT SYSTEM FOR ONLINE CUSTOMER ASSISTANCE

TECHNICAL FIELD

The present disclosure generally relates to computerized systems and methods for serving customers. More particularly, embodiments of the present disclosure relate to inventive and unconventional systems and methods for intelligent online customer assistance with inquiries.

BACKGROUND

Customers of an order fulfillment company, who may have issues relating to the delivery of ordered products, may be presented with static forms of Frequently Asked Questions (FAQs) to resolve their issues. Static forms of FAQs are pre-established questions that the order fulfillment company may deem to cover most common issues encountered by call representatives at a call center of the company. In addition, such static forms of FAQs may be offered by the order fulfillment company through its webpages when a customer attempts to search a website of the company to determine how to resolve a delivery issue.

However, such static FAQs often are not sufficient to individually address specific needs and issues relating to a given customer. This limited effectiveness of the static forms of FAQs may lead customers to forego using the FAQ webpages and instead call a customer representative of the company to obtain a more specific resolution of their issues.

Static FAQs are especially ineffective when an order fulfillment company decides to adopt a delivery system or method that is out of norm with the standard routine and operation in the order fulfillment industry. For example, the implementation of independent or occasional delivery workers who may be inexperienced with the delivery of products may cause a flood of customers calling a call center at the order fulfillment company, which the order fulfillment company may have difficulty sustaining. An unexpected flood of calls by customers to the call center may be due in great part to the static forms of FAQs being ineffective at resolving customers' issues. Such ineffective effectiveness and/or anticipation of problems related to delivery of products may drive down the order fulfillment company's delivery quality ratings and drive customers away from ordering with the order fulfillment company.

Therefore, there is a need for improved systems and methods for intelligent online customer assistance with inquiries.

SUMMARY

One aspect of the present disclosure is directed to a computer-implemented system for online customer assistance. The computer-implemented system comprises a user interface for a company to communicate with the customer, a memory storing instructions, and at least one processor. The at least one processor may be configured to execute the instructions to receive a request for assistance from a customer device via the user interface, identify at least one last-ordered product associated with the customer, and aggregate customer specific information based on the at least one last-ordered product, any one or more previously-ordered products by the customer, and the customer specific information that may include product delivery information. Furthermore, the at least one processor may be configured to execute the instructions to determine an action pattern of the customer for the at least one last-ordered product based on the customer specific information, assign a priority to the order for the at least one last-ordered product or the one or more previously-ordered products based on at least one of the delivery information or the customer action pattern, determine a response to the customer access based on the priority of the order, and provide, via the user interface, the response to the request from the customer device.

Another aspect of the present disclosure is directed to a computer-implemented method for online customer assistance. The method may comprise the steps of receiving a request for assistance from a customer device via the user interface, identifying at least one last-ordered product associated with the customer, and aggregating customer specific information based on the at least one last-ordered product, one or more previously-ordered products by the customer, and the customer specific information that may include product delivery information. Furthermore, the method may comprise determining an action pattern of the customer for the at least one last-ordered product based on the customer specific information, assigning a priority to the order for the at least one last-ordered product or the one or more other previously ordered based on at least one the delivery information or the customer action pattern, determining a response to the customer access based on the priority of the order, and providing, via the user interface, the request from the customer device.

Yet another aspect of the present disclosure is directed to a computer-implemented system for online customer assistance. The computer-implemented system comprises a user interface that may include a mobile application, a webpage, or an interactive voice response unit. Furthermore, the computer-implemented system comprises a memory storing instructions and at least one processor configured to execute instructions. The at least one processor may perform the steps that comprises detecting the customer accessing the user interface receiving a request for assistance from the mobile application, the webpage, or the interactive voice response unit, identifying the one or more products at least one last ordered product by associated with the customer, determining if the customer previously ordered one or more products has one or more previously-ordered products, and aggregating customer specific information based on the one or more last-ordered product at least one last-ordered product, the one or more other products previously-ordered one or more previously-ordered products if the customer previously ordered one or more products, and the customer specific information, which may include the product delivery information. Moreover, the at least one processor may perform the steps that comprise aggregating the customer specific information that may include arranging the one or more last-ordered product at least one last-ordered product and the one or more other products previously-ordered one or more previously-ordered products with delivery information and product type. In addition, the at least one processor may perform the steps that comprise parsing the product delivery information, which may include determining if the one or more last-ordered products at least one last-ordered product have been delivered to the customer, determining if the one or more last-ordered products at least one last-ordered product include one or more delivery restrictions, and determining if the one or more last-ordered product at least one last-ordered product is an exchange, return, or requiring a refund. Furthermore, the at least one processor may perform the steps that comprise determining an action pattern of the customer for the one or more last-ordered product at least one last-ordered product based on the customer specific information. The action pattern of the customer may also include a propensity of the customer to at least return, exchange, or request a refund for the one or more last-ordered products at least one last-ordered product. Moreover, the at least one processor may perform the steps that comprise assigning prioritizing a priority based on at least the one of the delivery information or the customer action pattern to the order for the one or more last-ordered products at least one last-ordered product based on the delivery information or the customer action patter or the one or more previously-ordered products, flagging the orders as critical, high, major, or minor, determining a response to the customer based on the priority of the order, and providing, via the user interface, the response to the customer via the user interface request from the customer in the mobile application, the webpage, or the interactive voice response unit.

Other systems, methods, and computer-readable media are also discussed herein.

BRIEF DESCRIPTION OF THE DRAWINGS

FIG. 9 is a flow chart of an exemplary method of determining FAQs and recommendations to provide to a customer, consistent with the disclosed embodiments.

DETAILED DESCRIPTION

Figure 1A:
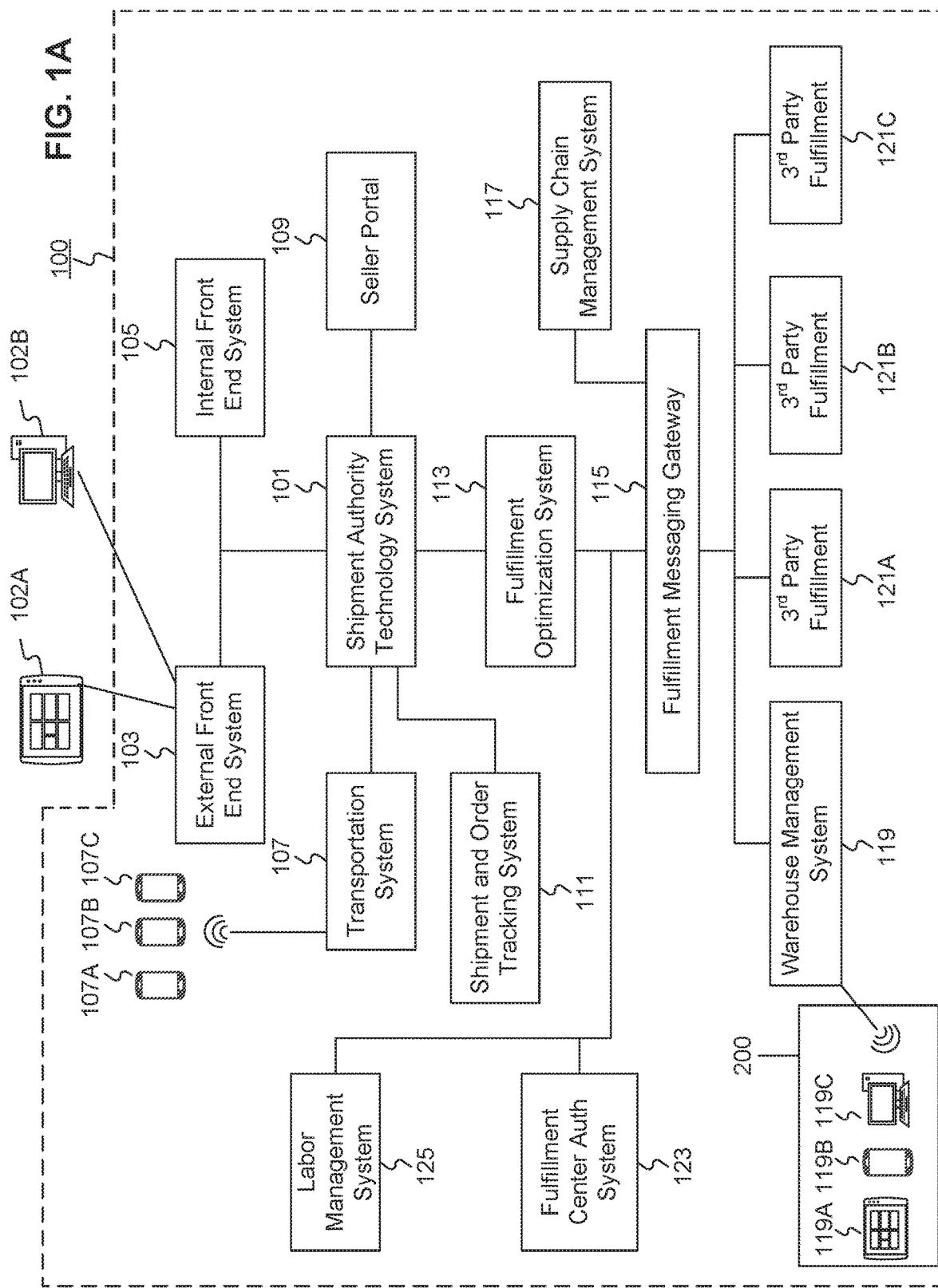
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

One adjustment that companies have attempted to implement to anticipate and reduce the flood of calls to customer representatives at call centers is to introduce additional static FAQs based on customers' issues with an adopted new delivery system or method. Furthermore, some companies have attempted to automate the generation of FAQs by utilizing databases that record delivery issues brought up by customers during calls with customer representatives. Those databases are in turn used to generate new sets of static FAQs with the most prevalent FAQs being presented to customers on the company website according to issues having the highest amount of calls or website traffic volume. However, even utilizing databases that record delivery issues in order to generate most prevalent static FAQs according to call or website traffic volume may still be ineffective at preventing customers from flooding call centers with customer issues.

Embodiments of the present disclosure are directed to systems and methods configured to specifically anticipate a customer's FAQs and make recommendations without the customer requesting options relating to order delivery issues, in order to avoid the customer contacting a customer representative. The anticipation of the customer's FAQs and determination of recommendations may be achieved according to the customer's propensity (i.e., behavioral tendency) with regard to an order's delivery based on the customer's prior history with a product type. Moreover, the anticipation of the customer's FAQs and determination of recommendations may also be achieved according to a history of customers generally with the same product type, if the customer has never previously ordered the product type. The improved method and system for anticipating FAQs and determining recommendations may be designed to satisfactorily resolve the customer's specific issues without the customer having to rely on calling a customer representative.

More specifically, the anticipation of a customer's propensity with regard to an order's delivery is achieved, in part, by considering action patterns of the customer about the ordered product and its delivery. The action patterns of the customer may be based on the history of the particular customer or of customers generally relating to the ordered product and delivery. For example, the action patterns of the particular customer relating to an ordered product may include the customer's propensity to inquire about the ordered product prior to delivery or the customer's propensity for the ordered product to be delivered within a certain time frame. The action patterns may also relate to the particular customer's propensity for the ordered product to be delivered at a specific location. Furthermore, the action patterns may also relate to the customer's propensity to request an exchange, return, or request a fund for certain ordered products when an ordered product may not have been delivered before a promised delivery date (PDD).

Referring to FIG. 1A, a schematic block diagram 100 illustrating an exemplary embodiment of a system comprising computerized systems for communications enabling shipping, transportation, and logistics operations is shown.

As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1 depicts a sample Cart page that includes items in a virtual shopping cart along with interactive user interface elements, consistent with the disclosed embodiments.
FIG. 1E depicts a sample Order page that includes items from the virtual shopping cart along with information regarding purchase and shipping, along with interactive user interface elements, consistent with the disclosed embodiments.
Figure 1E:

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
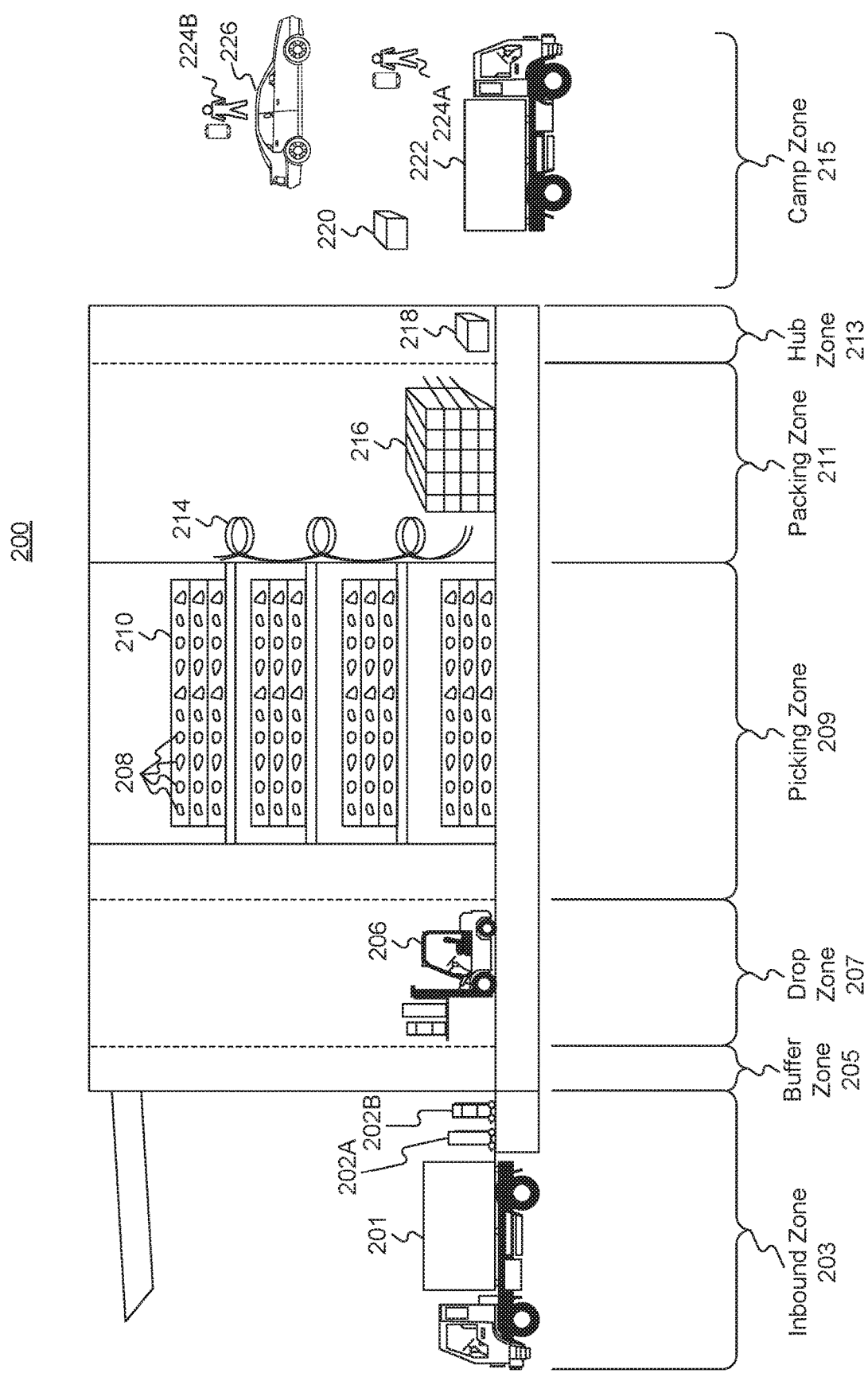
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
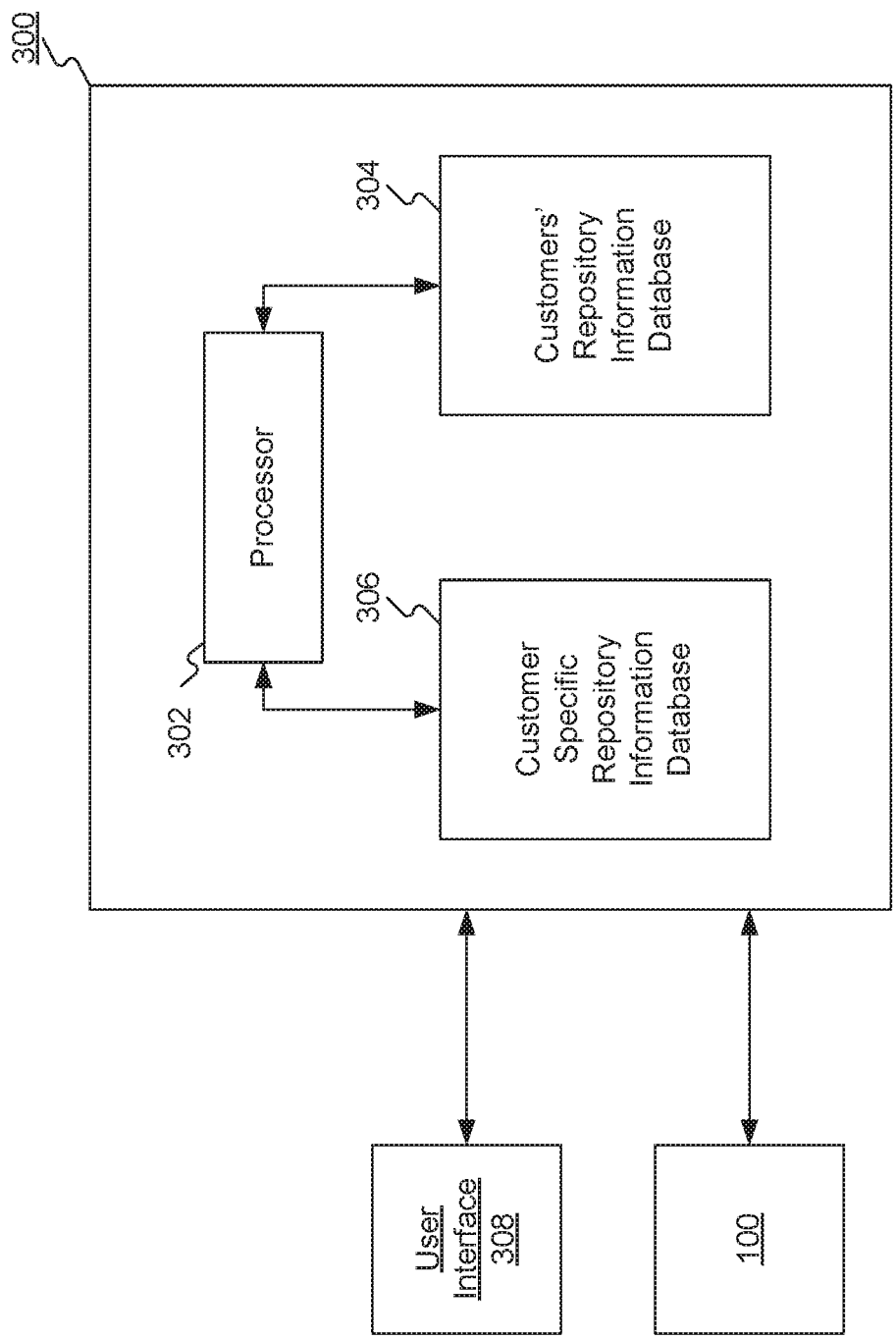
FIG. 3 is a block diagram illustrating an exemplary system for responding to customers, consistent with the disclosed embodiments.

FIG. 3 is a block diagram illustrating an exemplary system 300 for responding to customers, consistent with the disclosed embodiments. System 300 may determine FAQs and recommendations for responding to the customers. The at least one last-ordered product may be the customers' one or more orders not have yet been fulfilled (unfulfilled order(s)). The one or more orders may include a single order for one product, a package with a plurality of the same product, multiple orders each with a different product, or multiple orders each with their one or more plurality of products.

System 300 includes one or more processors 302 (referred to herein as processor 302) configured to obtain information from system 100 to build a Customers' Repository Information Database (CRID) 304. CRID 304 may include, in some embodiments, information about all previously-ordered products and delivered (fulfilled order(s)) and orders not yet delivered (unfilled orders) by all customers. The information included in CRID 304 may be acquired from FO system 113.

The information about the fulfilled and unfulfilled orders may include product specific information such as products' weights, sizes, shelf lives, number of items in a single package, and types or categories. The products' types or categories may be perishable and non-perishable items, electronic items, clothing items, kitchen ware. Moreover, the information about fulfilled and unfulfilled orders may also include product delivery information such as products' invoice IDs, order IDs, PDDs, delivery start dates, delivery start times, delivery completion dates, delivery completion times, delivery completion durations, delivery completion pictures, delivery types, actual delivery methods, camp zones 215, and countries of origin. Furthermore, the product delivery information may also include information about damaged products in the delivery process, defective products, missing products, and fraudulent products (not what they were intended to be). Moreover, the product delivery information may also include the customers' preferred receiving methods, IDs, names, addresses, e-mail addresses, and phone numbers. In addition, the product delivery information may also include sellers' address, phone numbers, e-mail addresses, and handling instructions. Furthermore, the product delivery information may also include orders' tracking numbers and statistical information relating to exchanges, returns, and requests for refunds. Processor 302 may continuously aggregate information about all the fulfilled and unfilled orders into CRID 304.

Furthermore, processor 302 may construct a Customer Specific Repository Information Database (CSRID) 306, once a customer has ordered one or more products, also referred to herein as last-ordered products, in order to anticipate the action patterns or propensities of the customer with regard to unfulfilled orders. CSRID 306 may include the same information that may be in CRID 304, but CSRID 306 may be specifically tailored to a customer having unfulfilled and fulfilled orders, and identified as customer specific information.

A user interface 308 may be included in External Front end System 103 where a customer device may be used to request assistance. User interface 308 may include a mobile application on a mobile device 102A, a webpage via computer device 102B, an interactive voice response unit (IVR), or other means for communicating via user interface 308.

Figure 4:
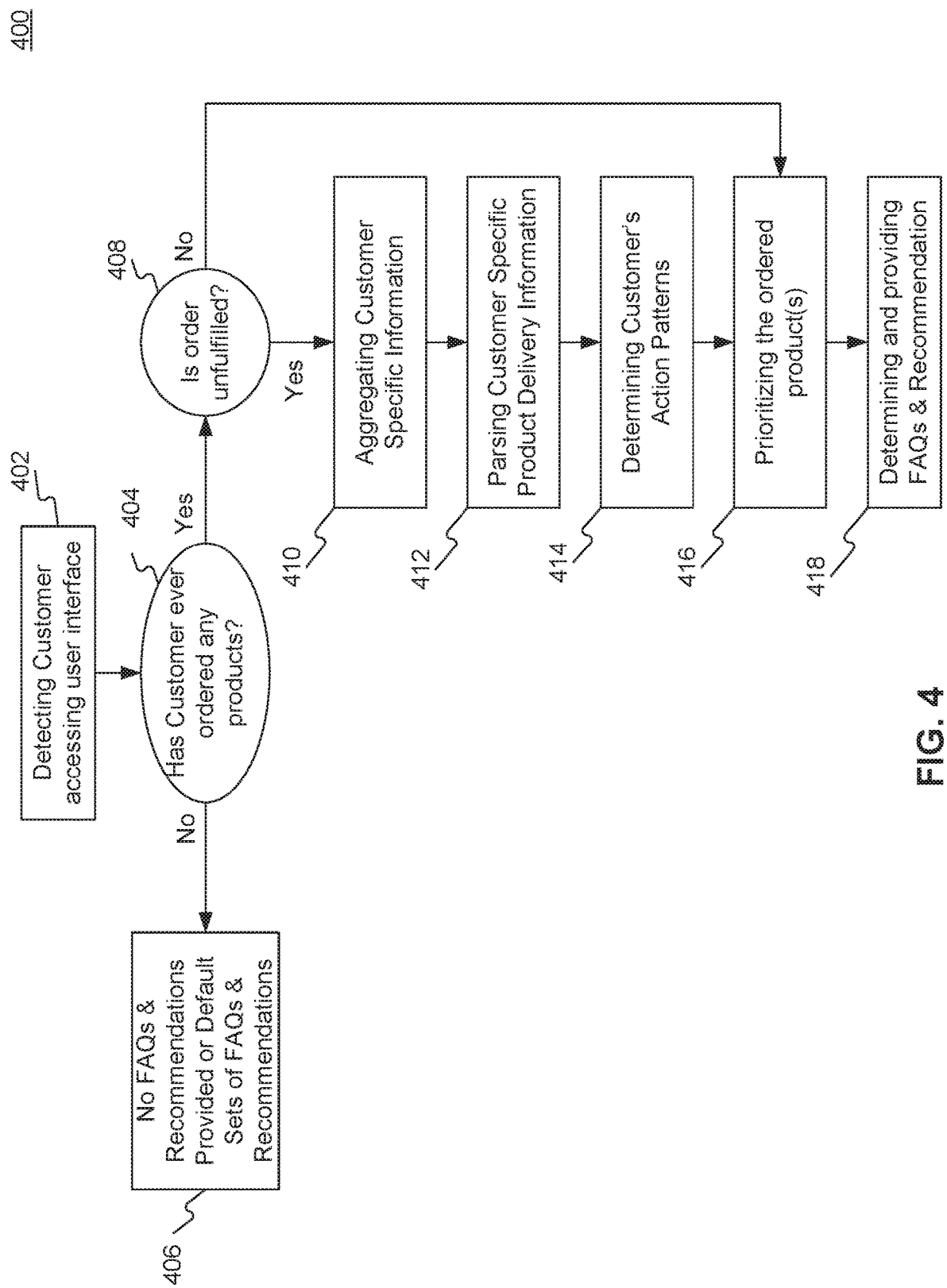
FIG. 4 is a flow chart of an exemplary method of determining FAQs and recommendations, consistent with the disclosed embodiments.

FIG. 4 is a flow chart of an exemplary method 400 of determining FAQs and recommendations, consistent with the disclosed embodiments. The steps of method 400 may be performed by processor 302. At step 402, processor 302 may detect a customer accessing user interface 308 to communicate with one or more devices or customer devices in system 100, or processor 302 may receive a request for assistance from the customer device. User interface 308 may include a mobile application on a mobile device 102A, a webpage via computer device 102B, an interactive voice response unit (IVR), or other means for communicating via user interface 308. At step 404, processor 302 may determine if the customer has any unfulfilled or fulfilled orders. For example, processor 302 may search CRID 304 for the unfulfilled and fulfilled orders of the customer.

At step 404, if processor 302 determines the customer has no unfulfilled or fulfilled orders (step 404·no), then processor 302 further determines at step 406 that no FAQs and recommendations will be provided to the customer, or processor 302 may provide a default set of FAQs and recommendations. However, if at step 404, processor 302 determines the customer has at any time ordered any products (step 404—yes), then at step 408 processor 302 checks whether the customer has any unfulfilled orders. Processor 302 may make the determination of whether there are any unfulfilled orders at step 408 by searching CRID 304 for unfulfilled orders of the customer. Processor 302 may have already designated fulfilled orders for previously-ordered products by the customer in CRID 304 after completing method 400.

If there is an unfulfilled order (step 408—yes), then processor 302 may aggregate customer specific information (step 410) by creating CSRID 306 where information about unfulfilled orders specific to the customer may be stored to identify the customer propensity with regard to unfulfilled orders.

At step 412, processor 302 may parse customer specific product delivery information for the unfulfilled order by searching GRID 304 for the product delivery information relating to the unfulfilled order. The parsed customer specific product delivery information may then be stored in CSRID 306 as customer specific information.

At step 414, processor 302 may determine customer action patterns, which may be the customer specific propensities, with regard to unfulfilled orders, to inquire or request certain product or product delivery information. The customer action patterns may be determined by searching CRID 304 for past customer action patterns with regard to fulfilled orders. The customer action patterns may then be stored in CSRID 306 by processor 302.

At step 416, processor 302 may prioritize by assigning levels of importance to the unfulfilled order according to the customer action patterns in CRID 304 and CSRID 306.

Furthermore, at step 408 processor 302 may determine that an order has been fulfilled (step 408·no), which means that a previously-ordered product was delivered to the customer. Processor 302 may prioritize by assigning levels of importance to the fulfilled order according to the customer action patterns in CRID 304 and CSRID 306. Moreover, processor 302 may have previously performed steps 410-414 of in method step 400 for previously fulfilled orders. Furthermore, processor 302 may iterate through all the unfulfilled and fulfilled orders of the customer to prioritize all of the orders according to the customer action patterns. Thus, in the prioritization of the unfulfilled and fulfilled orders (step 416), processor 302 may receive the customer specific information from CSRID 306 and also send the customer specific information with prioritized unfulfilled and fulfilled orders to CSRID 306. However, processor 302 may only receive information from CRID 304 during the prioritization of unfulfilled and fulfilled orders at step 416. Moreover, processor 302 may take each unfulfilled and fulfilled orders individually or in parallel from step 408 to step 416.

At step 418, processor 302 may determine and provide FAQs and recommendations based on a complete profile of the customer—the customer specific information—in CSRID 306, which includes the customer action patterns for each unfulfilled and fulfilled order. The FAQs and recommendations may be provided to the customer in order of importance without the customer having requested that information through the user interface 308. In addition, the complete information in CSRID 306 may be copied to CRID 304 for future order inquiries.

Figure 5:
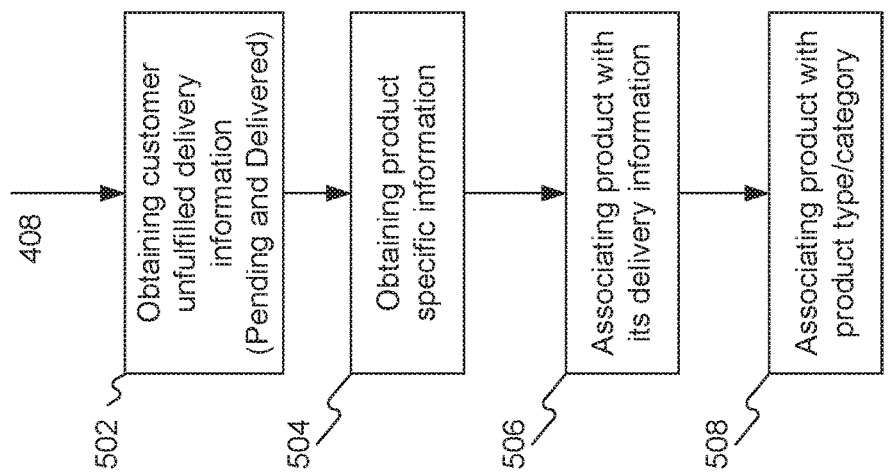
FIG. 5 is a flow chart of an exemplary method of aggregating customer specific information, consistent with the disclosed embodiments.

FIG. 5 is a flow chart of an exemplary method 500 of aggregating customer specific information, consistent with the disclosed embodiments. The steps of method 500 depicts an embodiment detailing steps to execute step 410. At step 502, processor 302 may obtain the product delivery information from CRID 304 for each product in the unfulfilled order. At step 504, processor 302 may obtain the product specific information from CRID 304 for each product in the unfulfilled order.

At step 506, processor 302 may associate each product in the unfulfilled order with the product delivery information. Processor 302 may store the association for each product in the unfulfilled order with the product delivery information in CSRID 306.

At step 508, processor 302 may associate each product in the unfulfilled order with the product specific information where processor 302 may, specifically, identify each product in the unfulfilled order with its type or category. Processor 302 may store the association for each product in the unfulfilled order with the product specific information in CSRID 306.

Figure 6A:
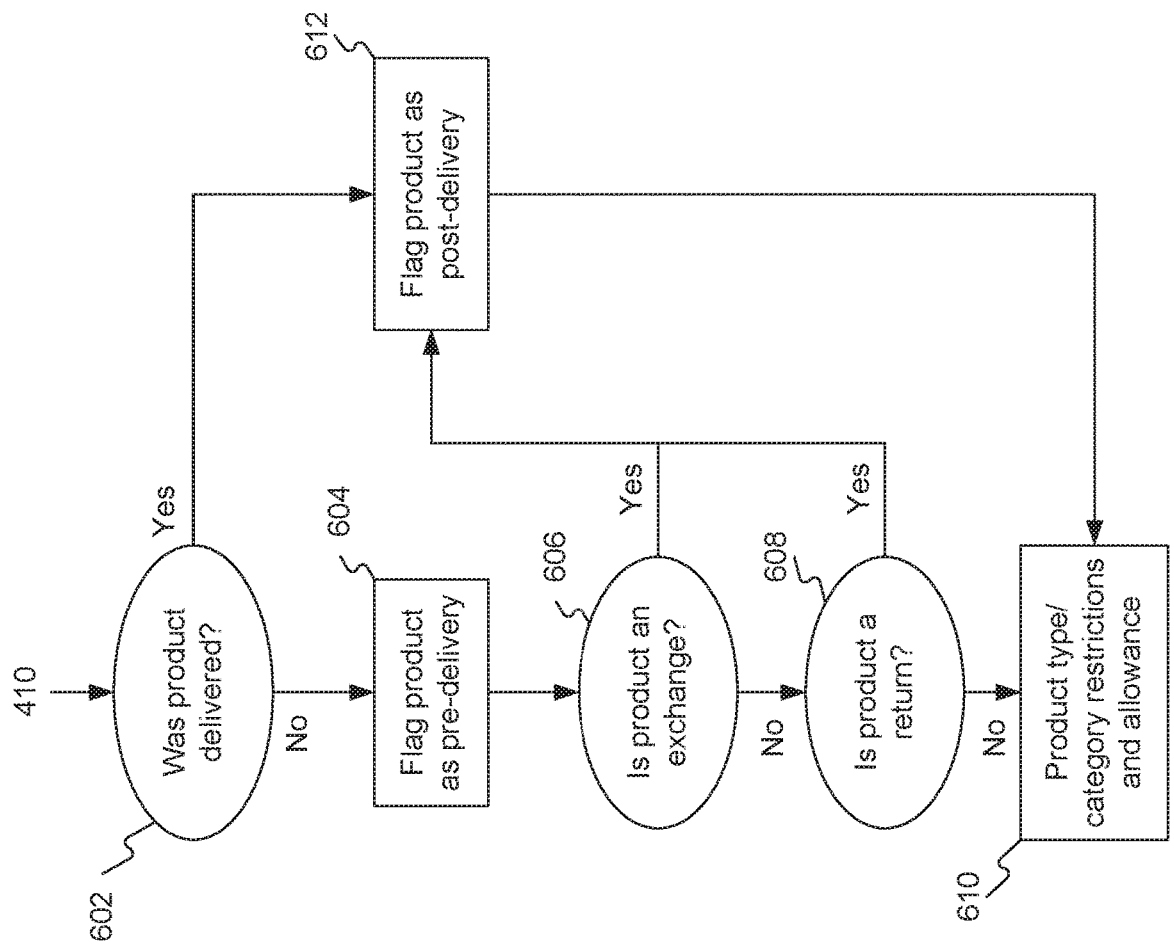
FIGS. 6A and 6B are flow charts of an exemplary method of parsing customer specific ordered product delivery information, consistent with the disclosed embodiments.
Figure 6B:
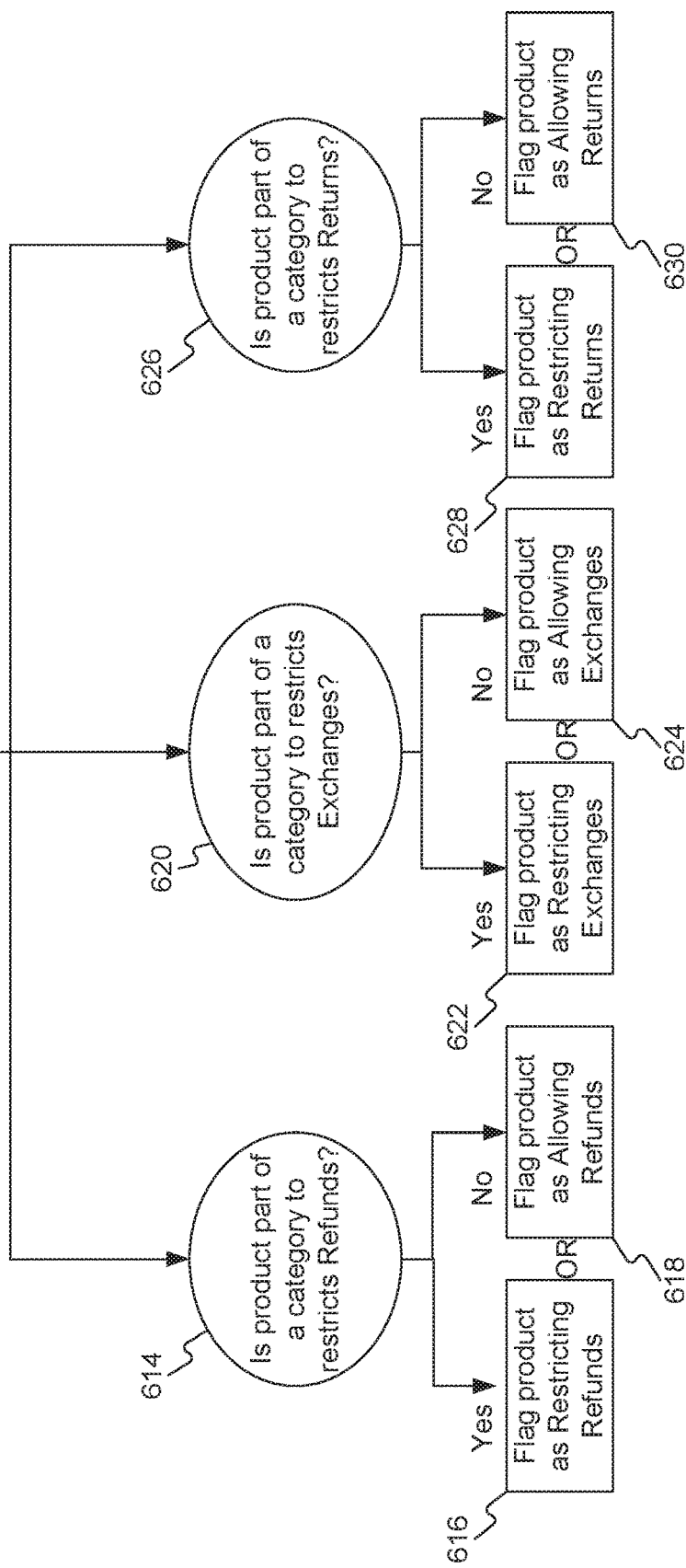

FIGS. 6A and 6B together are flow charts of an exemplary method 600 of parsing customer specific ordered product delivery information, consistent with the disclosed embodiments. The steps of method 600 depicts an embodiment detailing steps to execute step 412. The unfulfilled order may have one or multiple products where method 600 may iterate through each product in the unfulfilled order. At step 602, processor 302 may determine from information stored in CRID 304 whether or not the product in the unfulfilled order was delivered to the customer. If processor 302 determines that the unfulfilled order was not delivered (step 602·no), then at step 604, processor 302 flags the product in the unfulfilled order as a pre-delivery product. The pre-delivery flag may be stored in CSRID 306. At step 606, processor 302 may determine from information stored in CRID 304 whether or not the product in the unfulfilled order is an exchange. If processor 302 determines the product in the unfulfilled order is not an exchange (step 606·no), then at step 608, processor 302 determines from information stored in CRID 304 whether or not the product was a return. If processor 302 determines that the product was not a return (step 608·no), then at step 610, processor 302 may identify delivery restrictions or allowances that the customer may have for the product in the unfulfilled order.

However, if at step 602 processor 302 determines from information stored in CRID 304 that the product in the unfulfilled order was delivered (step 602—yes), or if at step 606 processor 302 determines from information stored in CRID 304 that the product in the unfulfilled order was an exchange (step 606—yes), or if at step 608 processor 302 determines from information stored in CRID 304 that the product in the unfulfilled order was a return (step 608—yes), then processor 302 flags the product in the unfulfilled order as a post-delivery (step 612). The post-delivery flag may be stored in CSRID 306.

Referring to FIG. 6B after performing step 608 or 612, processor 302 may determine from information stored in CRID 304 restrictions or allowances associated with a product type or category of the product in the unfulfilled order. For example, restriction may be a refund restriction, an exchange restriction, or a return restriction. Moreover, an allowance may be a refund allowance, an exchange allowance, or a return allowance. For example, the product in the unfulfilled order may be of the product type or category of "perishable," which may not be afforded a return allowance once the customer receives the product.

At step 614, processor 302 may determine whether or not the product in the unfulfilled order has a refund restriction. If processor 302 determines that the product in the unfulfilled order has refund restriction (step 614—yes), then processor 302, at step 616, flags the product of the unfulfilled product as having the refund restriction. However, if processor 302 determines that the product in the unfulfilled order does not have the refund restriction (step 614·no), then processor 302, at step 618, flags the product of the unfulfilled product as having a refund allowance. Processor 302 may store the refund restriction or allowance flag from step 616 or 618 in CSRID 306.

At step 620 processor 302 may determine whether or not the product in the unfulfilled order has an exchange restriction. If processor 302 determines that the product in the unfulfilled order has the exchange restriction (step 620—yes), then processor 302, at step 622, flags the product of the unfulfilled product as having the exchange restriction. However, if processor 302 determines that the product in the unfulfilled order does not have an exchange restriction (step 620·no), then processor 302, at step 624, flags the product of the unfulfilled product as having the exchange allowance. Processor 302 may store the exchange restriction or allowance flag from step 622 or 624 in CSRID 306.

At step 626 processor 302 determines whether or not the product in the unfulfilled order has a return restriction. If processor 302 determines that the product in the unfulfilled order has a return restriction (step 626—yes), then processor 302, at step 628, flags the product of the unfulfilled product as having the return restriction. However, if processor 302 identifies that the product in the unfulfilled order does not have a return restriction (step 626·no), then processor 302, at step 630, flags the product of the unfulfilled product as having the return allowance. Processor 302 may store the return restriction or allowance flag from step 628 or 630 in CSRID 306.

Figure 7:
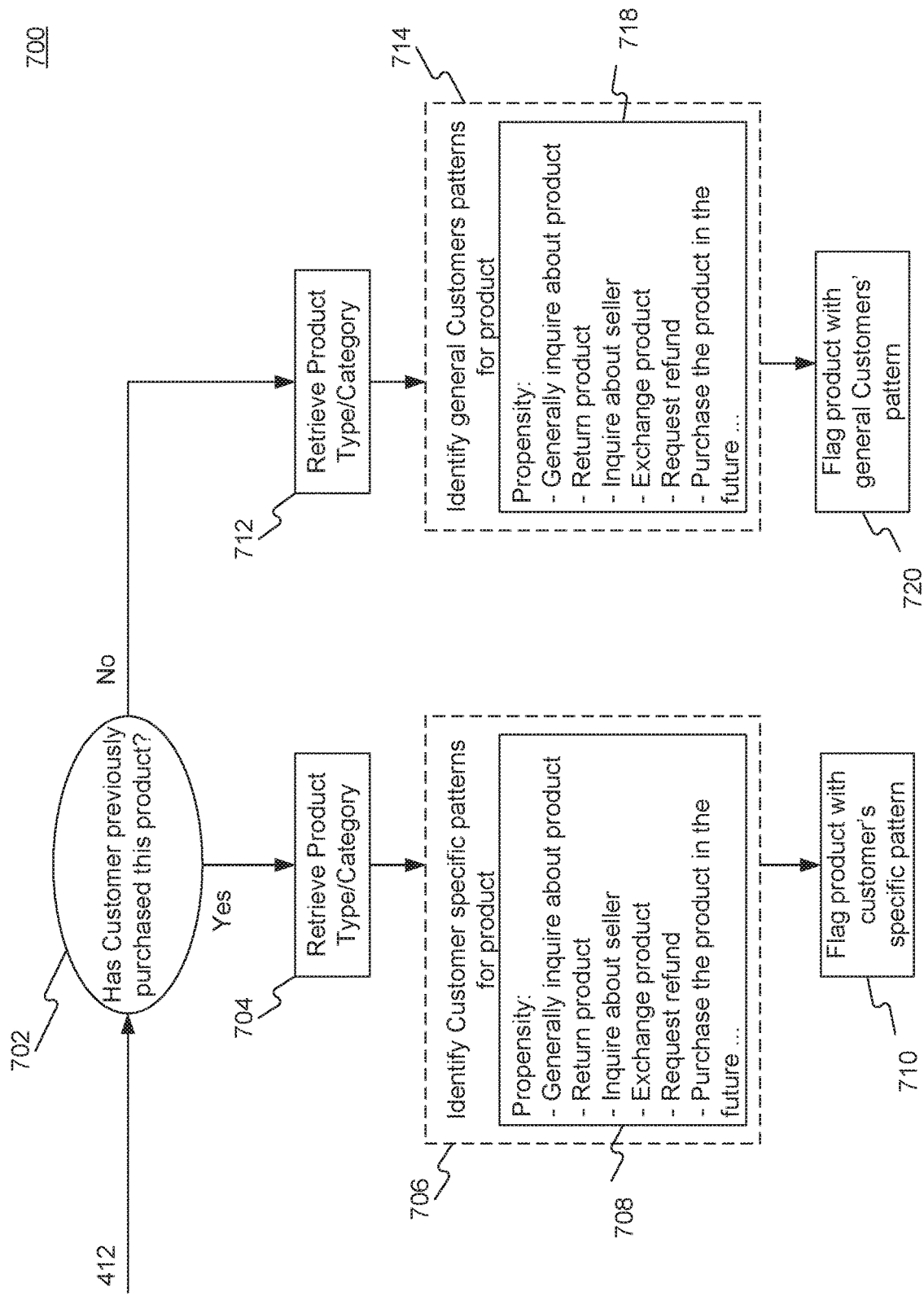
FIG. 7 is a flow chart of an exemplary method of determining customer action patterns for an ordered product, consistent with the disclosed embodiments.

FIG. 7 is a flow chart of an exemplary method 700 of determining customer action patterns for an ordered product, consistent with the disclosed embodiments. The steps of method 700 depicts an embodiment detailing steps to execute step 414 in which processor 302 may determine from information stored in CRID 304 a purchase history of the customer associated with the product. The unfulfilled order may have one or multiple products where method 700 may iterate through each product in the unfulfilled order. At step 702, processor 302 determines whether or not the product in the unfulfilled order was previously purchased by the customer. If processor 302 determines that the product in the unfulfilled order was previously purchased by the customer (step 702—yes), then processor 302, at step 704, retrieves the product type or category associated with the product in the unfulfilled order from information stored in CRID 304. At step 706, processor 302 identifies from information stored in CRID 304 the action patterns of the customer with the same product or products related to the same product type or category based on previous orders by the customer. More specifically, processor 302 retrieves the action patterns that may include the customer propensity to inquire about the product, return the product, exchange the product, request a refund, repurchase the product, or inquire about the seller. Furthermore, the customer propensity may also include the customer inquiring about the product delivery information or the product specific information, or the customer purchasing the product in the future. At step 710, processor 302 may flag the product of the unfulfilled order with the action patterns identified at step 706 of the customer. Processor 302 may store the action patterns flagged to the product of the unfulfilled order in CSRID 306 as customer specific information.

However, if processor 302, at step 702, determines that the product in the unfulfilled order was never previously purchased by the customer (step 702·no), the processor 302, at step 712, retrieves the product type or category associated with the product in the unfulfilled order from information stored in CRID 304. At step 714, processor 302 identifies from information stored in CRID 304 the action patterns of general customers with the same product or products related to the same product type or category based on previous orders from customers in general More specifically, processor 302 retrieves the action patterns that may include the general customers propensity to inquire about the product, return the product, exchange the product, request a refund, repurchase the product, or inquire about the seller. Furthermore, the general customers propensity may also include the general customers inquiring about the product delivery information or the product information. At step 720, processor 302 may flag the product of the unfulfilled order with the action patterns identified at step 714 of the general customers. Processor 302 may store the action patterns of the general customers flagged to the product of the unfulfilled order in CSRID 306 as customer specific information.

Figure 8A:
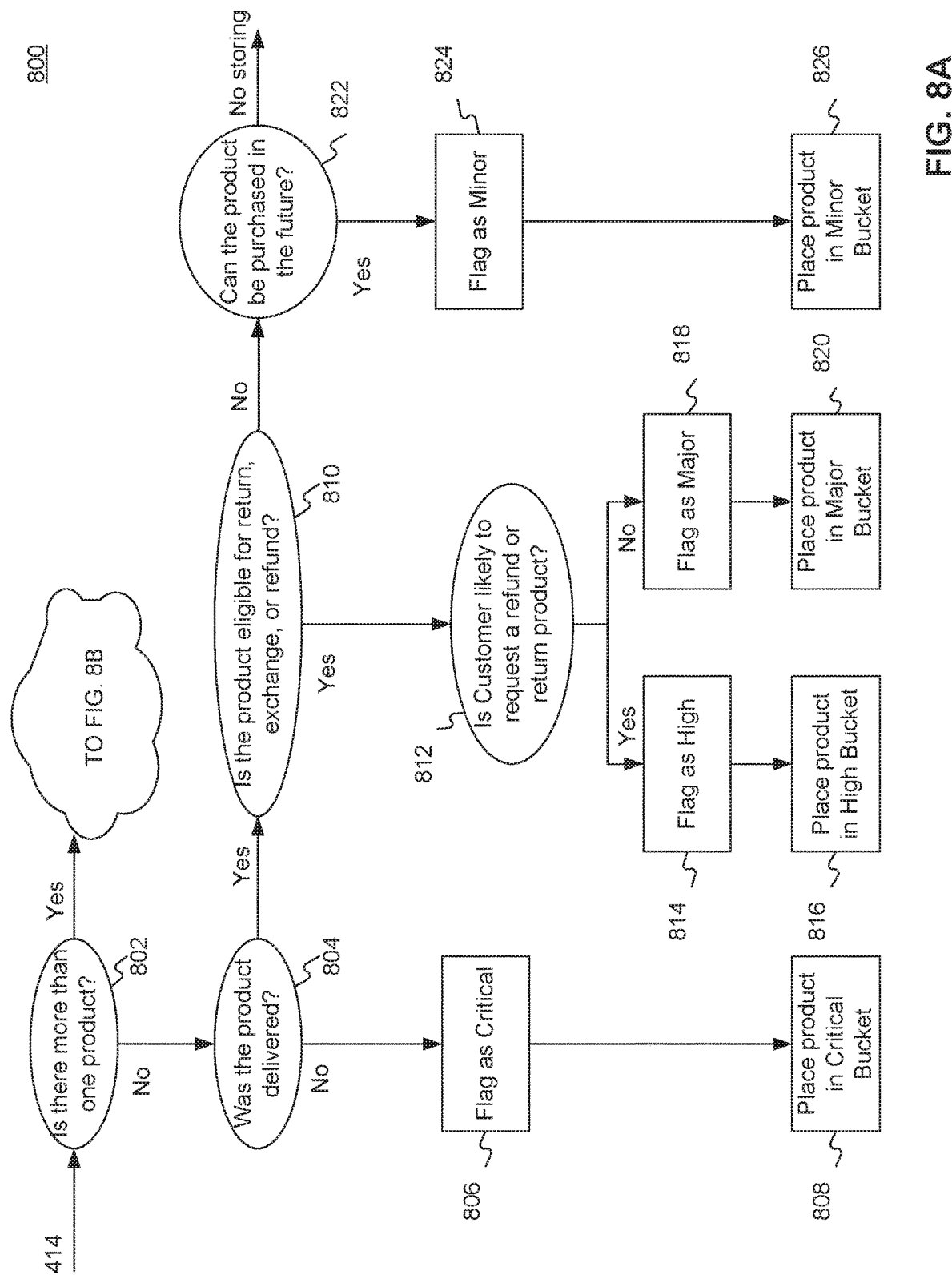
FIG. 8A is a flow chart of an exemplary method of prioritizing a single ordered product, consistent with the disclosed embodiments.

FIG. 8A is a flow chart of an exemplary method 800 of prioritizing a single ordered product, consistent with the disclosed embodiments. The steps of method 800 depicts an embodiment detailing steps to execute step 416. At step 802, processor 302 determines from information stored in CRID 304 whether or not the unfulfilled or fulfilled orders have more than one product. If processor 302 determines that the unfulfilled or fulfilled orders have more than one product (step 802—yes), then processor 302 proceeds to FIG. 8B. However, if processor 302 determines that the unfulfilled or fulfilled orders have the one product (step 802·no), then, at step 804, processor 302 may determine from information stored in CSRID 306 whether or not the one product was delivered to the customer. If processor 302 determines from information stored in CSRID 306 that the one product was not delivered to the customer, which means that the one product is the unfulfilled order (step 804·no), then at step 806, processor 302 may flag the one product as having a critical status. Processor 302 may store the critical status flag of the one product in CSRID 306. At step 808, processor 302 may store the one product in CSRID 306 in a critical status bucket. Moreover, processor 302 may ignore all the restrictions from step 412 or method 600 of the one product in the critical status bucket.

However, if processor 302 determines from information stored in CSRID 306 that the one product was delivered to the customer (step 804—yes), then at step 810, processor 302 may determine from information stored in CSRID 306 whether or not the one product has the return restriction, the exchange restriction, or the refund restriction. If processor 302 determines from information stored in CSRID 306 that the one product does not have the return restriction, the exchange restriction, or the refund restriction (step 810—yes), then, at step 812, processor 302 may determine from information stored in CSRID 306 whether or not the one product is likely to be returned or likely for a refund requested based on the customer action patterns. If processor 302 determines from information stored in CSRID 306 that the one product is likely to be returned or likely for the refund requested based on the customer action patterns (step 812—yes), then, at step 814, processor 302 flags the one product as having a high status. Processor 302 may store the high status flag of the one product in CSRID 306. At step 816, processor 302 may store the one product in CSRID 306 in a high status bucket. However, if processor 302 determines from information stored in CSRID 306 that the one product is not likely to be returned or not likely for a refund requested based on the customers action patterns (step 812·no), then, at step 818, processor 302 may flag the one product as having a major status. Processor 302 may store the major status flag of the one product in CSRID 306. At step 820, processor 302 may store the one product in CSRID 306 in a major status bucket.

However, if processor 302 determines from information stored in CSRID 306 that the one product has the return restriction, the exchange restriction, and the refund restriction (step 810·no), then, at step 822, processor 302 determines from the action patterns stored in CSRID 306 whether or not the customer is likely to repurchase the one product in the future. If processor 302 determines from the action patterns in CSRID 306 that the customer is likely to repurchase the one product in the future (step 822—yes), then, at step 824, processor 302 may flag the one product as having minor status. Processor 302 may store the minor status flag of the one product in CSRID 306.

At step 826, processor 302 may store the one product in CSRID 306 in a minor status bucket. However, if processor 302 determines from the action patterns in CSRID 306 that the customer is not likely to repurchase the one product in the future (step 822—no), then, processor 302 does not store any information because the one product remains a fulfilled order.

Figure 8B:
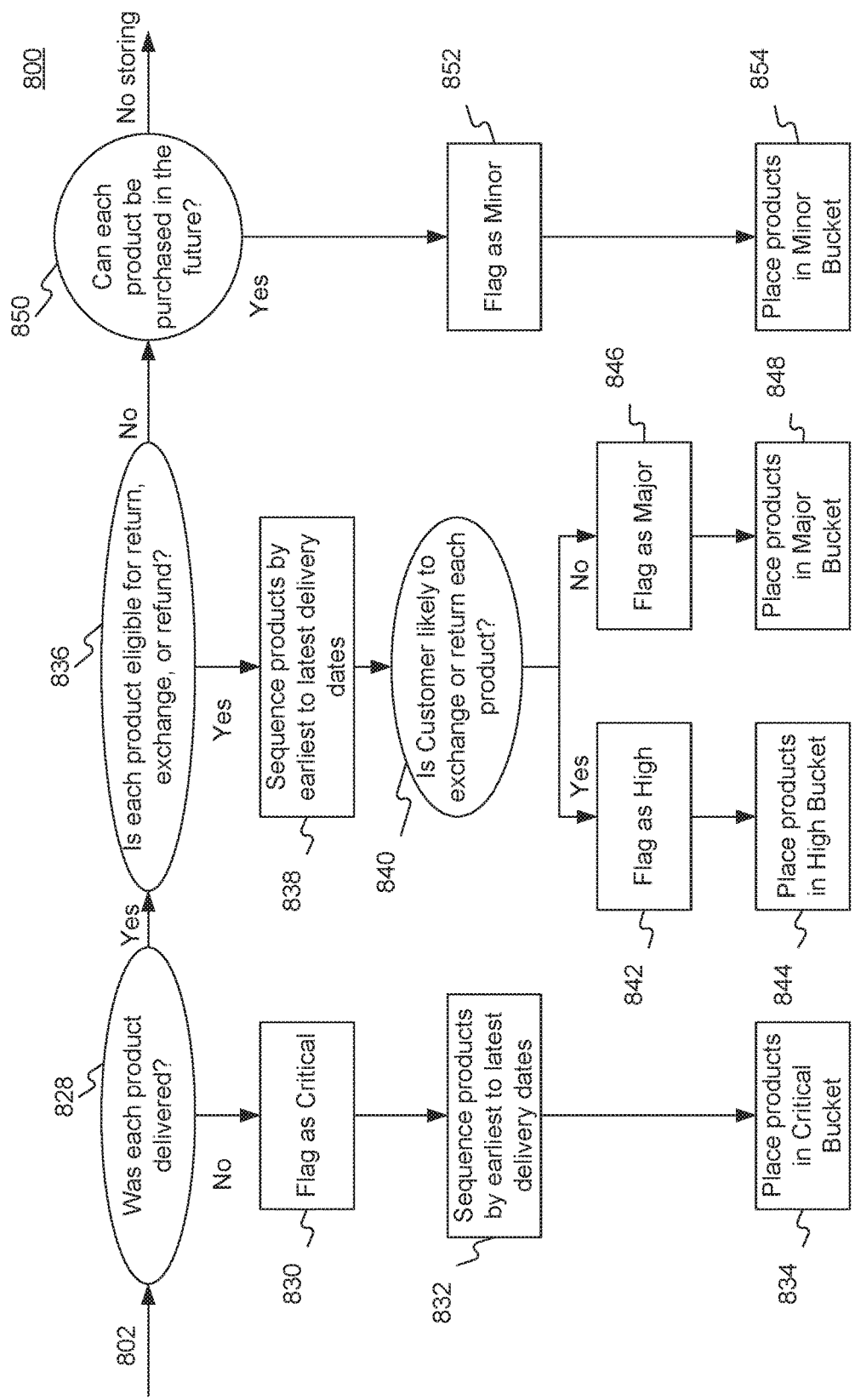
FIG. 8 is a flow chart of an exemplary method of prioritizing a plurality of ordered products, consistent with the disclosed embodiments.

FIG. 8B is a flow chart of an exemplary prioritizing a plurality of ordered products, consistent with the disclosed embodiments. Since processor 302 may have identified a plurality of products in each the unfulfilled or fulfilled orders at step 802, at step 828, processor 302 may iteratively take each product for the unfulfilled and fulfilled orders to determine whether or not each product was delivered to the customer. If processor 302 determines from information stored in CSRID 306 that each product was not delivered to the customer, which means that each product may be an unfulfilled order (828·no), then at step 830, processor 302 may flag each product as having critical status. Processor 302 may store the critical status flag of each product in CSRID 306. At step 832, processor 302 may sequence all the products according to their earliest to latest PDDs. At step 834, processor 302 may store each product in CSRID 306 in the critical status bucket according to the date sequence at step 832. Moreover, processor 302 may ignore all the restrictions from step 412 or method 600 of each product in the critical status bucket.

However, if processor 302 determines from information stored in CSRID 306 that each product was delivered to the customer (step 828—yes), then at step 836, processor 302 may determine from information stored in CSRID 306 whether or not each product has the restriction, the exchange restriction, or the refund restriction. If processor 302 determines from CSRID 306 that each product does not have the return restriction, the exchange restriction, or the refund restriction (step 836—yes), then, at step 838, processor 302 may sequence all the products according to their earliest to latest PDDs. At step 838, processor 302 may store the sequence of all the products at step 838 in CSRID 306. At step 840, processor 302 may determine from information stored in CSRID 306 whether or not each product is likely to be returned or likely for a refund requested based on the customer action patterns. If processor 302 determines from information stored in CSRID 306 that each product is likely to be returned or likely for the refund requested based on the customer action patterns (step 840—yes), then, at step 842, processor 302 flags each product as having a high status. Processor 302 may store the high status flag of each product in CSRID 306. At step 844, processor 302 may store all the products in CSRID 306 in the high status bucket according to the date sequence at step 838. However, if processor 302 determines from information stored in CSRID 306 that each product is not likely to be returned or not likely for a refund requested based on the customer action patterns (840·no), then at step 846, processor 302 may flag each product as having major status. Processor 302 may store the major status flag of each product in CSRID 306. At step 848, processor 302 may store all the products in CSRID 306 in the major status bucket according to the date sequence at step 838.

However, if processor 302 determines from information stored in CSRID 306 that each product has the return restriction, the exchange restriction, and the refund restriction (step 836·no), then, at step 850, processor 302 may determine from the customer action patterns stored in CSRID 306 whether or not the customer is likely to repurchase each product in the future. If processor 302 determines from the customer action patterns in CSRID 306 that the customer is likely to repurchase each product in the future, then, at step 852, processor 302 may flag each product as having minor status. Processor 302 may store the minor status flag of all the products in CSRID 306. At step 854, processor 302 may store each product in CSRID 306 in the minor status bucket. However, if processor 302 determines from the customer action patterns in CSRID 306 that the customer is not likely to repurchase each product in the future (step 850·no), then, processor 302 does not store any information because each product remains a fulfilled order.

FIG. 9 is a flow chart of an exemplary method 900 of determining FAQs and recommendations to provide to a customer, consistent with the disclosed embodiments. The steps of method 900 depicts an embodiment detailing steps to execute step 418. At step 902, processor may consider each product in the critical status bucket and the minor status bucket and, at step 904, may generate FAQs and recommendations based on the information in CSRID 306. Moreover, at step 904, processor 302 may ignore any flag restrictions in CSRID 306 for each product in the critical status bucket to generate the FAQs and recommendations.

At step 906, processor 302 may determine from information stored in CSRID 306 whether or not each product, in the high status bucket and the major status bucket, have flags for the action patterns in step 414 conflicting with flags restrictions in step 412. If processor 302, for each product in the high bucket and the major bucket, identifies that no flags for the action patterns in step 414 conflict with the flag restrictions in step 412 (step 906·no), then at step 910, processor 302 may generate FAQs and recommendations based on the information in CSRID 306 for each product. However, if processor 302, for each product in the high bucket and the major bucket, identifies that any flags for the action patterns in step 414 conflict with any flag restrictions in step 412 (step 906—yes), then at step 912, processor 302 ignores the flags for the action patterns in step 414 for the conflicting flag restrictions in step 412. At step 914, processor 302 may generate FAQs and recommendations for each product based on the flag restrictions in step 412 and the information in CSRID 306. At step 914, processor 302 may not use the flags for the action patterns in step 414 to generate the FAQs and recommendations.

At step 916, processor 302 may store the FAQs and recommendations for each product in the critical status bucket, the high status bucket, the major status bucket, and the minor status bucket in CSRID 306. At step 918, processor provides the FAQs and recommendations for each product according to its bucket via the user interface 308. At step 920, processor 302 detects via the user interface 308 whether or not the customer selects one or more specific FAQs. If processor 302 detects via the user interface 308 that the customer selects one or more specific FAQs (step 920—yes), then at step 918, processor 302 would provide the recommendations for the one or more specific FAQs. However, if processor 302 detects via the user interface 308 that the customer has not selected a specific FAQ (step 920·no), then processor 302 does waits for a customer's response. Processor 302 may store all of the information in CSRID 306 after step 418 in CRID 304.

For example, processor 302 may have identified that a customer has milk with a given shelf life as a last ordered product (steps 402-408). Accordingly, processor 302 may categorize milk as a "Fresh Food" and having a shelf life at step 410. Moreover, processor 302 may identify at step 412 that the milk was delivered to the customer on a specific date. Furthermore, processor 302 may identify restrictions at step 412 with "Fresh Food," where processor 302 may know from CRID 304 that the category "Fresh Food" does not allow exchanges. Processor 302 may, additionally, determine at step 414 that the customer is likely to request a refund for milk. At step 416, processor 302 may prioritize the order for milk as high since the milk was already delivered to the customer. Therefore, at step 418, processor 302 may recommend a refund to the customer along with the information that the shelf-life of the milk expired before the delivery date of the milk in the high bucket category.

Another example is where processor 302 identifies that a customer has a last-ordered product ordered from an international seller that was not yet delivered to the customer-steps 402-416. Processor 302 may flag the international last-ordered product as critical. In addition, based on the customer specific information and product delivery information that processor 302 may have obtained customer specific information at step 410 and product delivery information at step 412. At step 418, processor 302 may provide the FAQ "where is my product?" or "when is my expected delivery date" or "what is the international seller information?" The respective recommendations that processor 302 may provide is the location of the last-ordered product ordered from an international seller in route to its delivery, the expected date that the customer would receive the last ordered product from an international seller, or the phone number of the international seller, respectively.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for online customer assistance, the system comprising:
    a user interface for a company to communicate with the customer;
    a memory storing instructions; and
    at least one processor configured to execute the instructions to perform steps comprising:
        receiving a request for assistance from a customer device via the user interface;
        identifying at least one last-ordered product associated with the customer;
        aggregating customer specific information based on the at least one last-ordered product, one or more previously-ordered products by the customer, and the customer specific information including product delivery information;

parsing the product delivery information based on the at least one last-ordered product and the one or more previously-ordered products by the customer, wherein the parsing includes determining at least one of whether the at least one last-ordered product has been delivered to the customer, includes one or more delivery restrictions, an exchange, or a return, or requires a refund;

determining, based on the customer specific information, an action pattern of the customer for the at least one last-ordered products;

assigning a priority, based on at least one of the delivery information or the customer action pattern, to the order for the at least one last-ordered products or for the one or more previously-ordered products;

determining a response to a customer access based on the priority of the order; and providing, via the user interface, the response to the request from the customer device.

2. The system of claim 1, wherein the user interface includes a mobile application, a webpage, or an interactive voice response unit.

3. The system of claim 1, wherein the at least one processor is further configured to perform steps comprising:
identifying a product type of the at least one last-ordered product and the one or more other previously-ordered products;
wherein the aggregating includes associating the at least one last-ordered product and the one or more previously-ordered products with the delivery information and the product type.

4. The system of claim 1, wherein the at least one-processor is further configured to perform steps comprising:
obtaining product specific information of the at least one last-ordered product and the one or more previously-ordered products;
wherein the aggregating includes obtaining the product specific information for the at least one last-ordered product and the one or more previously-ordered products.

5. The system of claim 1, wherein the at least one processor is further configured to perform step comprising:
parsing the product delivery information based on the at least one last-ordered product and the one or more previously-ordered products by the customer;
wherein the parsing includes determining if the at least one last-ordered product have been delivered to the customer.

6. The system of claim 1, wherein the at least one processor is further configured to perform steps comprising:
parsing the product delivery information based on the at least one last-ordered product and the one or more previously-ordered products by the customer;
wherein the parsing includes determining if the at least one last-ordered product include one or more delivery restrictions.

7. The system of claim 1, wherein the at least one processor is further configured to perform steps comprising:
parsing the product delivery information based on the at least one last-ordered product and the one or more previously-ordered products by the customer;
wherein the parsing includes determining if the at least one last-ordered product include an exchange, a return, or require a refund.

8. The system of claim 1, wherein the determining the action pattern includes determining a propensity of the customer to return, exchange, or request a refund for the at least one last-ordered product.

9. The system of claim 1, wherein there are more than one last-ordered products, the prioritizing including sequencing respective delivery dates for the at least one last-ordered product.

10. The system of claim 1, wherein the prioritizing the order for the at least one last-ordered product include flagging the order as critical, high, major, or minor.

11. A computer-implemented method for online customer assistance, the method comprising:
receiving a request for assistance from a customer device via the user interface;
identifying at least one last-ordered product associated with the customer;
aggregating customer specific information based on the at last-ordered product, one or more previously-ordered products by the customer, and the customer specific information including product delivery information;
parsing the product delivery information based on the at least one last-ordered product and the one or more previously-ordered products by the customer, wherein the parsing includes determining at least one of whether the at least one last-ordered product has been delivered to the customer, includes one or more delivery restrictions, an exchange, or a return, or requires a refund;
determining, based on the customer specific information, an action pattern of the customer for the at least one last-ordered product;
assigning a priority, based on at least one of the delivery information or the customer action pattern, to the order for the at least one last-ordered product or for the one or more previously-ordered products;
determining a response to a customer access based on the priority of the order; and
providing, via the user interface, the response to the request from the customer device.

12. The method of claim 11, wherein the customer accesses the user interface using a mobile application, a webpage, or an interactive voice response unit.

13. The method of claim 11, further the method comprising:
identifying a product type of the at least one last-ordered product and the one or more previously-ordered products;
wherein the aggregating includes associating the at least one last-ordered product and the one or more previously-ordered products with the delivery information and the product type.

14. The method of claim 11, further the method comprising:
obtaining product specific information of the at least one last-ordered product and the one or more previously-ordered products;
wherein the aggregating includes obtaining the product specific information for the at least one last-ordered product and the one or more previously-ordered products.

15. The method of claim 11, further the method comprising:
parsing the product delivery information based on the at least one last-ordered product and the one or more previously-ordered products by the customer;
wherein the parsing includes determining if the at least one last-ordered product have been delivered to the customer.

16. The method of claim 11, further the method comprising:
parsing the product delivery information based on the at least one last-ordered product and the one or more previously-ordered products by the customer;
wherein the parsing includes determining if the at least one last-ordered product include one or more delivery restrictions.

17. The method of claim 11, further the method comprising:
parsing the product delivery information based on the at least one last-ordered product and the one or more previously-ordered products by the customer;
wherein the parsing includes determining if the at least one last-ordered product include an exchange, a return, or require a refund.

18. The method of claim 11, wherein the determining the action pattern includes determining a propensity of the customer to return, exchange, or request a refund for the at least one last-ordered product.

19. The method of claim 11, wherein the prioritizing the order for the at least one last-ordered product include flagging the orders as critical, high, major, or minor.

20. A computer-implemented system for online customer assistance, the system comprising:
a user interface for communicating between the customer and a company, wherein the user interface includes a mobile application, a webpage, or an interactive voice response unit;
a memory storing instructions; and
at least one processor configured to execute the instructions to perform steps comprising:
receiving a request for assistance from the mobile application, the webpage, or the interactive voice response unit;
identifying at least one last-ordered product associated with the customer,
determining if the customer has one or more previously-ordered products;
aggregating customer specific information based on the at least one last-ordered product, one or more previously-ordered products, and the customer specific information including product delivery information;
aggregating the customer specific information including arranging the at least one last-ordered product and the one or more previously-ordered products with delivery information and product type;
parsing the product delivery information including determining if the at least one last-ordered products have been delivered to the customer;
determining if the at least last-ordered product include one or more delivery restrictions; and
determining if the at least one last-ordered product is an exchange, return, or requiring a refund;
determining, based on the customer specific information, an action pattern of the customer for the at least one last-ordered products;
determining the action pattern of the customer including determining a customer propensity to at least return, exchange, or request the refund for the at least one last-ordered products;
assigning a priority, based on at least one of the delivery information or the customer action pattern, to the order for the at least one last-ordered product or the one or more previously-ordered products;
flagging the order as critical, high, major, or minor;
determining a response to a customer access based on the priority of the order; and
providing, via the user interface, the response to the request from the customer in the mobile application, the webpage, or the interactive voice response unit.

21. The system of claim 1, wherein the user interface provides the response to a selection from the customer device based on the customer action pattern for the at least one last-ordered product,
wherein the response includes a critical bucket, a high bucket, a major bucket, and a minor bucket.

* * * * *

UNITED STATES PATENT AND TRADEMARK OFFICE
CERTIFICATE OF CORRECTION

Page 1 of 2

PATENT NO. : 11,238,463 B2
APPLICATION NO. : 16/872779
DATED : February 1, 2022
INVENTOR(S) : Pea et al.

It is certified that error appears in the above-identified patent and that said Letters Patent is hereby corrected as shown below:

In the Claims

In Claim 1, Column 23, Lines 10-11, "the at least one last-ordered products;" should read --the at least one last-ordered product;--.

In Claim 1, Column 23, Line 14, "the at least one last-ordered products" should read --the at least one last-ordered product--.

In Claim 4, Column 23, Lines 33-34, "one-processor" should read --one processor--.

In Claim 5, Column 23, Line 43, "perform step comprising:" should read --perform steps comprising:--.

In Claim 5, Column 23, Lines 47-48, "the at least one last-ordered product have been delivered" should read --the at least one last-ordered product has been delivered--.

In Claim 6, Column 23, Lines 55-56, "the at least one last-ordered product include" should read --the at least one last-ordered product includes--.

In Claim 7, Column 23, Lines 63-64, "the at least one last-ordered product include" should read --the at least one last-ordered product includes--.

In Claim 7, Column 23, Line 65, "require a refund." should read --requires a refund.--.

In Claim 10, Column 24, Line 8, "the at least one last-ordered product include" should read --the at least one last-ordered product includes--.

In Claim 11, Column 24, Lines 17-18, "the at last-ordered product," should read --the at least one last-ordered product,--.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,238,463 B2

In Claim 15, Column 24, Lines 65-66, "the at least one last-ordered product have been delivered" should read --the at least one last-ordered product has been delivered--.

In Claim 16, Column 25, Lines 6-7, "the at least one last-ordered product include" should read --the at least one last-ordered product includes--.

In Claim 17, Column 25, Lines 14-15, "the at least one last-ordered product include" should read --the at least one last-ordered product includes--.

In Claim 17, Column 25, Line 16, "require a refund." should read --requires a refund.--.

In Claim 19, Column 25, Line 22, "the at least one last-ordered product include" should read --the at least one last-ordered product includes--.

In Claim 20, Column 26, Lines 10-11, "the at least one last-ordered products have been delivered" should read --the at least one last-ordered product has been delivered--.

In Claim 20, Column 26, Line 12, "the at least last-ordered product include" should read --the at least one last-ordered product includes--.

In Claim 20, Column 26, Lines 17-18, "the at least one last-ordered products;" should read --the at least one last-ordered product;--.

In Claim 20, Column 26, Lines 21-22, "the at least one last-ordered products;" should read --the at least one last-ordered product;--.